US010893015B2

(12) United States Patent
Garvey

(10) Patent No.: US 10,893,015 B2
(45) Date of Patent: Jan. 12, 2021

(54) PRIORITY TOPIC MESSAGING

(71) Applicant: ADP, LLC, Roseland, NJ (US)

(72) Inventor: Stephen Dale Garvey, Alpharetta, GA (US)

(73) Assignee: ADP, LLC, Roseland, NJ (US)

( * ) Notice: Subject to any disclaimer, the term of this patent is extended or adjusted under 35 U.S.C. 154(b) by 0 days.

(21) Appl. No.: 16/424,632

(22) Filed: May 29, 2019

(65) Prior Publication Data

US 2020/0382463 A1    Dec. 3, 2020

(51) Int. Cl.
| G06F 15/16 | (2006.01) |
| H04L 12/58 | (2006.01) |
| G06F 9/54 | (2006.01) |
| H04L 29/08 | (2006.01) |
| G06Q 10/10 | (2012.01) |

(52) U.S. Cl.
CPC ............. *H04L 51/26* (2013.01); *G06F 9/546* (2013.01); *H04L 51/046* (2013.01); *H04L 67/26* (2013.01); *G06Q 10/105* (2013.01)

(58) Field of Classification Search
CPC ..... H04L 67/322; H04L 51/26; H04L 49/901; H04L 51/046; H04L 43/106; H04L 51/063; H04L 49/9057; G06F 9/546; G06F 16/283; G06Q 40/04
See application file for complete search history.

(56) References Cited

U.S. PATENT DOCUMENTS

| 7,324,802 | B2* | 1/2008 | Jennings | H04M 3/5116 455/404.1 |
| 9,038,093 | B1* | 5/2015 | Leonard | G06F 9/546 719/314 |
| 2005/0262215 | A1* | 11/2005 | Kirov | G06Q 10/107 709/207 |
| 2015/0120854 | A1* | 4/2015 | Bhat | H04L 67/322 709/207 |
| 2016/0224380 | A1* | 8/2016 | Wang | G06F 9/546 |
| 2016/0357778 | A1* | 12/2016 | MacKenzie | G06F 16/178 |
| 2019/0182188 | A1* | 6/2019 | Nugent | G06F 9/546 |
| 2020/0036773 | A1* | 1/2020 | Dar | H04L 67/327 |

* cited by examiner

*Primary Examiner* — Cheikh T Ndiaye
(74) *Attorney, Agent, or Firm* — Patrick J. Daugherty; Daugherty & Del Zoppo Co. LPA

(57) ABSTRACT

Aspects subscribe consumer message threads to each of a plurality of topics including a high-priority topic and a different, low-priority topic; initialize both the high-priority and low-priority topics as not-paused; poll for an unread message from not-paused ones of the high-priority and low-priority topics; in response to a return of an unread message from polling the not-paused ones of the high-priority and low-priority topics, pause the low-priority topic and process the returned unread message; and, until determining that no new message is returned, iteratively repoll for new unread messages from not-paused ones of the high-priority and low-priority topics and process any new unread messages returned from each repolling, wherein the low-priority topic is paused during each repolling executed prior to determining that no new message is returned from the repolling.

17 Claims, 2 Drawing Sheets

PRIORITY TOPIC MESSAGING

BACKGROUND

Human resource management (sometimes "HRM" or "HR") generally refers to functions and systems deployed in organizations that are designed to facilitate or improve employee, member or participant performance in service of strategic objectives. HR comprehends how people are identified, categorized and managed within organizations via a variety of policies and systems. Human Resource management systems may span different organization departments and units with distinguished activity responsibilities.

Organizations may implement multiple versions of or services from an HR system that have different configurations and user-specific permissions and responsive behaviors. Human Resource Information Systems (HRIS) comprehend information technology (IT) systems and processes configured and utilized in the service of HR, and HR data processing systems may integrate and manage information from a variety of different applications and databases, including distributed streaming platform message queueing. Capabilities of distributed streaming message queueing platforms include publishing and subscribing to streams of records, storing streams of records in a fault-tolerant durable way, and processing streams of records as they occur.

SUMMARY

In one aspect of the present invention, a method includes a processor subscribing a plurality of consumer message threads to each of a plurality of topics that include a high-priority topic and a different, low-priority topic; initializing the high-priority topic and the low-priority topic as not-paused; polling for an unread message from not-paused ones of the high-priority topic and the low-priority topic; in response to a return of an unread message from polling for an unread message from not-paused ones of the high-priority topic and the low-priority topic, pausing the low-priority topic and processing the returned unread message; and until determining that no new message is returned, iteratively repolling for new unread messages from not-paused ones of the high-priority topic and the low-priority topic and processing any new unread messages returned from each repolling, wherein the low-priority topic is paused during each repolling executed prior to determining that no new message is returned from the repolling.

In another aspect, a system has a hardware processor in circuit communication with a computer-readable memory and a computer-readable storage medium having program instructions stored thereon. The processor executes the program instructions stored on the computer-readable storage medium via the computer-readable memory and thereby subscribes a plurality of consumer message threads to each of a plurality of topics that include a high-priority topic and a different, low-priority topic; initializes the high-priority topic and the low-priority topic as not-paused; polls for an unread message from not-paused ones of the high-priority topic and the low-priority topic; in response to a return of an unread message from polling for an unread message from not-paused ones of the high-priority topic and the low-priority topic, pauses the low-priority topic and processes the returned unread message; and until determining that no new message is returned, iteratively repolls for new unread messages from not-paused ones of the high-priority topic and the low-priority topic and processes any new unread messages returned from each repolling, wherein the low-priority topic is paused during each repolling executed prior to determining that no new message is returned from the repolling.

In another aspect, a computer program product has a computer-readable storage medium with computer-readable program code embodied therewith. The computer-readable program code includes instructions for execution which cause the processor to subscribe a plurality of consumer message threads to each of a plurality of topics that include a high-priority topic and a different, low-priority topic; initialize the high-priority topic and the low-priority topic as not-paused, and poll for an unread message from not-paused ones of the high-priority topic and the low-priority topic; in response to a return of an unread message from polling for an unread message from not-paused ones of the high-priority topic and the low-priority topic, pause the low-priority topic and process the returned unread message; and until determining that no new message is returned, iteratively repoll for new unread messages from not-paused ones of the high-priority topic and the low-priority topic and process any new unread messages returned from each repolling, wherein the low-priority topic is paused during each repolling executed prior to determining that no new message is returned from the repolling.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

DETAILED DESCRIPTION

Figure 1:
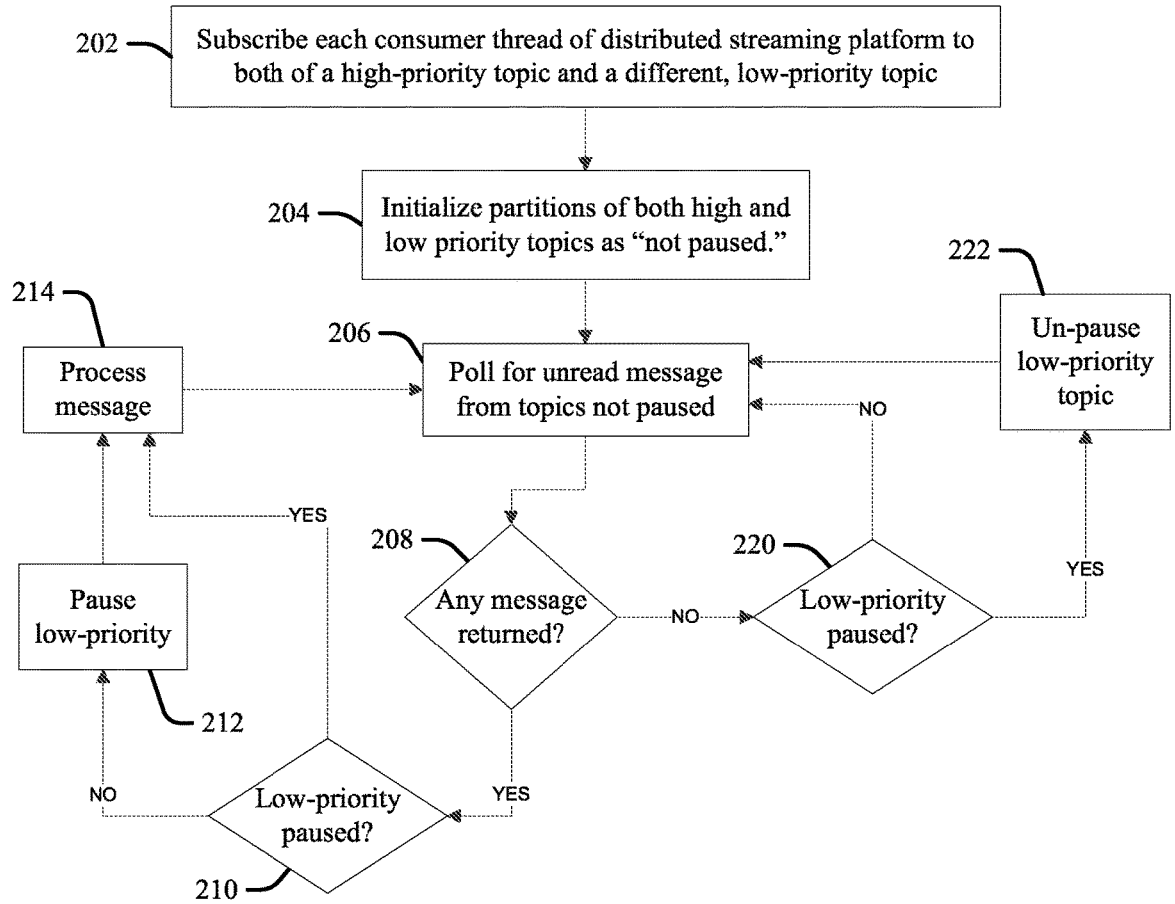
FIG. 1 is a flow chart illustration of a method or process aspect according to an embodiment of the present invention.

One example of a distributed streaming message queueing platform deployed within HR and other systems is Apache Kafka®, an open-source message queueing system. (KAFKA is a trademark of the Apache Software Foundation in the United States or other countries.) KAFKA is generally used for building real-time streaming data pipelines that reliably get data between systems or applications, and building real-time streaming applications that transform or react to the streams of data. KAFKA may be run as a cluster on one or more servers that can span multiple datacenters.

A KAFKA cluster stores streams of records in categories called "topics." Each record consists of a key, a value, and a timestamp. The topic is a category or feed name to which records are published: messages are written to a topic wherein another process reads from that topic. Topics in KAFKA are multi-subscriber, wherein a topic can have zero, one, or many consumers that subscribe to the data written thereto.

For each topic, the KAFKA cluster maintains a partitioned log, wherein each topic may have many different physical partitions. Each partition is an ordered, immutable sequence of records that is continually appended to: a structured commit log. The records in the partitions are each assigned a sequential identity indicia (ID) number called an "offset" that uniquely identifies each record within the partition.

KAFKA includes four basic, core REST (Representational State Transfer) Application Programming Interfaces (APIs): a "Producer API" that allows an application to publish a stream of records to one or more KAFKA topics; a "Consumer API" that allows an application to subscribe to one or more topics and process the stream of records produced to them; a "Streams API" that allows an application to act as a stream processor, consuming an input stream from one or more topics and producing an output stream to one or more output topics, effectively transforming the input streams to output streams; and a "Connector API that allows building and running reusable producers or consumers that connect KAFKA topics to existing applications or data systems (for example, a connector to a relational database might capture every change to a table).

Consumers generally label themselves with a consumer group name, and each record published to a topic is delivered to one consumer instance within each subscribing consumer group. Consumer instances can be in separate processes or on separate machines. If all the consumer instances have the same consumer group, then the records will effectively be load balanced over the consumer instances. If all the consumer instances have different consumer groups, then each record will be broadcast to all the consumer processes.

Resource allocation and efficiency problems arise in conventional message queueing platforms due to a lack mechanisms to differentiate or maximize consumer thread utilization across different topics based on topic priority, to give one topic priority over the other. Some messages are more important, or need more immediate attention and expenditure of system resources to resolve, relative to other messages that are less-important, or wherein their resolution or associated expenditure of resources may instead be deferred to a later time, or to a time during which the resource expenditure is less costly. For example, higher priority topic events includes messages from customers currently and actively logging into a system to acquire system services, which may require a profile rebuild or permission refresh in order to process or otherwise satisfy the message, such as when a new product has been deployed in an intervening time period since the last time that the customer logged in and requested the service.

In contrast, some topic events may be messages from system administrators to pro-actively rebuild a profile or refresh a permission for another customer that is not currently logged in and actively seeking the same service. The expenditure of resources for such pro-active services may limit available bandwidth of system resources for meeting the needs of the higher-priority topic events, resulting in delay or lags in meeting the higher-priority topic events that proportionately reduce customer satisfaction in the requested service.

Resource expenditures may also be more costly, or have less available bandwidth or capacity to meet associated processing needs, during some time periods: for example, during peak business hours, relative to off-peak hours (night-time, weekend, or other time periods that have less message activity). Also, system resources and their associated costs must be maintained at a high enough level to meet possible or anticipated message loading needs: as conventional systems do not have means for deferring the handling of lower priority messages, they must maintain capacity and cost expenditures at levels that meet the simultaneous needs of both high and low priority messages.

In contrast, embodiments of the present invention use differentiated topic priority structures to prevent, defer or otherwise minimize the processing of low priority messages during periods of active consumer messaging activities, to thereby focus system resources and bandwidth on processing only the higher priority messages during such active periods, which reduces processing resource usage, bandwidth demands and resource usage cost in proportion to the amount of low-priority message processing that is stopped, or deferred to a different time period during which more bandwidth or resources are available, or processing costs are other lower.

Embodiments further maximize resource efficiencies via improving consumer utilization of all available threads across different topics, even while giving one topic priority over another. In conventional message queueing threads are generally dedicated to specific topics, which results in situations where some threads are idle when there are no messages available on their specific topics, while other threads must bear the load of processing the messages on their own, different, specific topics. In contrast, embodiments of the present invention spread message processing load across all threads by subscribing each topic partition to all topics, thereby making every thread available to process messages from any and all topics. Thus, no thread sits idle due to mismatch of message topic, but instead the embodiments ensure that all available resources are used to meet current message processing needs, which are also effectively reduced and managed to increase customer satisfaction relative to conventional systems and approaches by making sure that the higher-priority topic messages of said customers are processed before other messages on a lower-priority topic.

FIG. 1 illustrates an exemplary embodiment according to the present invention. Some examples are described herein with respect to a KAFKA platforms; however, one skilled in the art will appreciate that embodiments can be adapted for use on other distributed streaming platforms that utilize API calls, for example the IBM® MQ™ queue manager, the Amazon Simple Queue Service (Amazon SQS) system, etc. (IBM and MQ are trademarks of the International Business Machines Corporation in the United States and other countries.) Thus, the invention is not limited to KAFKA or KAFKA-type embodiments described herein.

At 202 a processor configured according to the present invention (the "configured processor") subscribes each and every of a plurality of different consumer threads of a distributed streaming platform to both of a (first) high-priority message topic and a different (second) low-priority message topic. Embodiments deployed within KAFKA use a KAFKA "Consumer subscribe( ) API" to subscribe the threads to both the high and low-priority topics at 202. Generally the high-priority topic is defined as a message from a customer or other system user via usual login activity that requests a service, and which may require a profile rebuild or permission refresh in processing the message; and the low priority topic event is defined as any other message that is not triggered, in response to or associated to message from a customer via usual login activity or by other usual customer activity. Low-priority topic messages include a change in service terms or by an administrator, such as associated with deployment of a new product that is deployed while the customer user is inactive. Still other examples of low-priority events or commands triggering a profile rebuild or permission refresh for the customer user that is not associated with (is independent of) user activity will be apparent to one skilled in the art.

At 204 the configured processor initialize the partitions of the both the high and low priority topics as "not paused." More particularly, KAFKA and other message queueing systems enable selective pausing of topic messages, wherein messages for paused topics are not returned, while messages are returned for un-paused topics.

At 206 the configured processor polls for any new, unread message from the topics that are subscribed to and are not paused. Generally the polling at 204 and the processes described thereafter below are driven to receiving individual messages, wherein the processes iteratively repeat for each single message poll and reception, or determination of lack of message reception. In a KAFKA deployment example, the configured processor reads a message any existing topic inclusive of the high and the low priority topic using the KAFKA "Consumer poll( ) API."

If a message is returned at 208 (condition "Yes"), at 210 the configured processor determines wherein the low-priority topic subscription current paused: if so (condition "Yes"), then at 214 the configured processor processes the message and returns to poll for a next, new message at 206. Alternatively, if determined at 210 that low-priority topic is not paused (condition "No"), then at 212 the configured processor pauses the low-priority topic, at 214 processes the message, and returns to poll for a next, new message at 206.

Therefore, as the embodiment pauses the low-priority topic at 212, or it has been previously paused in an earlier iteration (as determined by a "Yes" condition at 210), only messages for the high-priority topic, initialized as un-paused at 204, and any other un-paused topics, are returned by subsequent iterations of polling at 206, until the low-priority topic or any other paused topic is un-paused. Thus, so long as another new message is returned in response to each polling iteration at 206 (after each iteration of 210-212-214), the embodiment ensures that only the high-priority topic messages are processed (as the low-priority topic stays paused with each subsequent polling iteration at 206, until no messages are returned at 208.

Determining a failure to return a message at 208 (condition "No") in response to polling for a new message at 206 indicates a pause in normal customer or other high-priority message traffic frequency: that the high-priority consumer thread is not receiving new messages. This condition is typically indicative of off-peak hours (for example, during overnight, weekend, afternoon or other time periods outside of peak customer business activity time periods) or other conditions in which resources may now be allocated to processing the low-priority topic messages (including the resources that were otherwise limited to processing only the high-priority topics at 210-212-214), wherein the embodiment will now allocate processing resources to processing low-priority messages.

Accordingly, in response to the "No" condition at 208, at 220 the configured processor determines whether the low-priority topic is currently paused: if not (condition "No"), then the configured processor returns to poll for new, unread messages at 206; otherwise, in response to determining at 220 that the low-priority topic is currently paused (condition "Yes"), at 222 the configured processor un-pauses the low-priority topic, and then returns to poll for new, unread messages at 206. Some embodiments configured for a KAFKA message queue use a KAFKA "Consumer resume( )" API to resume (un-pause) paused low-priority topic partitions at 222.

Thus, in a next iteration of polling for new messages at 206, as both the high-priority and low-priority topics are now un-paused, low-priority messages may now be returned at 208 for processing at 214.

Figure 2:
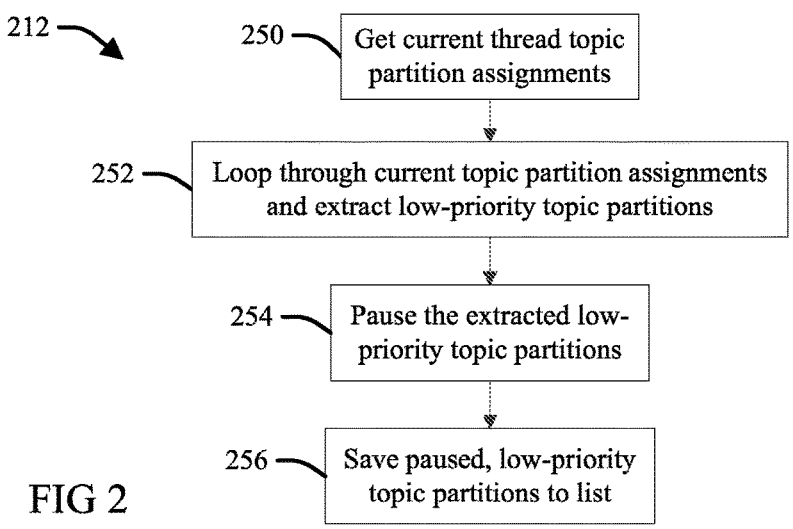
FIG. 2 is a flow chart illustration of another method or process aspect according to an embodiment of the present invention.

FIG. 2 illustrates one embodiment of a process for pausing the low-priority topic messages at 212 of FIG. 1. At 250 the configured processor gets current thread topic partition assignments; for example, embodiments deployed or configured for a KAFKA message queue use a KAFKA "Consumer assignment( )" API to get the current thread topic partition assignments.

At 252 the configured processor iteratively loops through the current topic partition assignments and extracts all the low priority topic partitions.

At 254 the configured processor pauses the extracted low-priority topic partitions; for example, embodiments configured for a KAFKA message queue use a KAFKA "Consumer pause( )" API to pause the extracted low-priority topic partitions.

At 256 the configured processor saves the paused, low-priority topic partitions to a list, so that they may be more easily un-paused.

Figure 3:
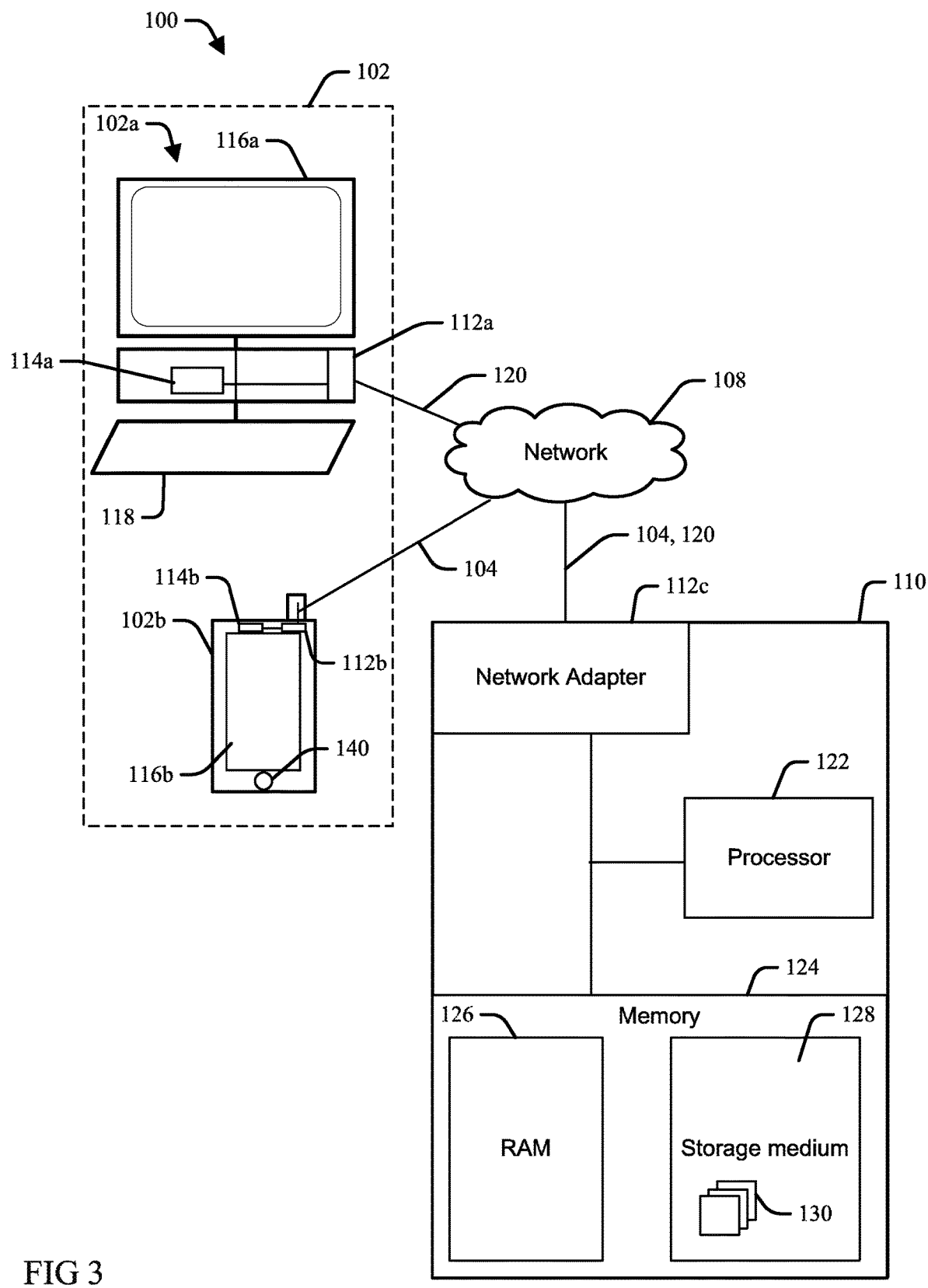
FIG. 3 is a graphic illustration of an example of another implementation according to an embodiment of the present invention.

FIG. 3 is a schematic, graphic illustration of an embodiment of a system 100 according to the present invention. The system 100 includes one or more local computing devices 102, such as, for example, a desktop computer 102a or smartphone 102b; other examples includes a laptop computer, personal digital assistant, tablet, cellular telephone, body worn device, or the like. Lines of the schematic illustrate communication paths between the devices 102a, 102b and a computer server 110 over a network 108, and between respective components within each device. Communication paths between the local computing devices 102a and 102b and the computer server 110 over the network 108 include respective network interface devices 112a, 112b, and 112c within each device, such as a network adapter, network interface card, wireless network adapter, and the like.

In one example the smartphone 102b routes a customer message 104 provided after logging-in to a service (including in response to an input through a GUI display device 116b, or a verbal command received via a microphone 140) over a network 108 to a high-priority topic partition of a computer server 110 (for example, a physical partition within a random access memory 126, or the storage medium 128) via their respective network interface adapters 112b and 112c. The computer server 110 includes a processor 122 configured (thus, the "configured processor" discussed above with respect to FIG. 1 or FIG. 2) with instructions stored in a memory 124. The processor 122 of the computer server 110 and the processors 114a and 114b of the local computing devices include, for example, a digital processor, an electrical processor, an optical processor, a microprocessor, a single core processor, a multi-core processor, distributed processors, parallel processors, clustered processors, combinations thereof and the like. The memory 124 includes a computer-readable random access memory (RAM) 126 and a computer-readable storage medium 128.

As described above with respect to FIG. 1, the computer server 110 polls for the message and outputs processing of the message for the un-paused topics as a data output 120 over the network 108 to the local computing device 102a via their respective network interface adapters 112c and 112a; or does not read the incoming message in the event it is routed to a paused, low-priority thread partition.

The local computing devices 102 include one or more input devices 118, such as a keyboard, mouse, microphone, touch screen, etc., and wherein the processor 114a drives display devices 116a to present data values as described above with respect to FIG. 1. The computer-readable storage medium 128 can be a tangible device that retains and stores instructions for use by an instruction execution device, such as the processor 122. The computer-readable storage medium 128 may be, for example, but is not limited to, an electronic storage device, a magnetic storage device, an optical storage device, an electromagnetic storage device, a semiconductor storage device, or any suitable combination of the foregoing.

A computer-readable storage medium 128, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be transmitted to respective computing/processing devices from the computer-readable storage medium 128 or to an external computer or external storage device via the network 108. The network 108 can include private networks, public networks, wired networks, wireless networks, data networks, cellular networks, local area networks, wide area networks, the Internet, and combinations thereof. The network interface devices 112a, 112b and 122c in each device exchange (receive and send) computer-readable program instructions from and through the network 108 and, include storage in or retrieval from the computer-readable storage medium 128.

Computer-readable program instructions for carrying out operations of the present invention may include assembler instructions, instruction-set-architecture (ISA) instructions, machine instructions, machine dependent instructions, microcode, firmware instructions, state-setting data, configuration data for integrated circuitry, compiled or interpreted instructions, source code or object code written in any combination of one or more programming languages or programming environments, such as Java®, Javascript®, C, C#, C++, Python, Cython, F#, PHP, HTML, Ruby, and the like. (JAVA and JAVASCRIPT are trademarks of Oracle America, Inc., in the United States or other countries.)

The computer-readable program instructions may execute entirely on the computer server 110, partly on the computer server 110, as a stand-alone software package, partly on the computer server 110 and partly on the local computing devices 102 or entirely on the local computing devices 102. For example, the local computing devices 102 can include a web browser that executes HTML instructions transmitted from the computer server 110, and the computer server executes JAVA instructions that construct the HTML instructions. In another example, the local computing devices 102 include a smartphone application, which includes computer-readable program instructions to perform the processes described above.

The memory 124 can include a variety of computer system readable media. Such media may be any available media that is accessible by computer server 110, and the media includes volatile media, non-volatile media, removable, non-removable media, and combinations thereof. Examples of the volatile media can include random access memory (RAM) and/or cache memory. Examples of non-volatile memory include magnetic disk storage, optical storage, solid state storage, and the like. As will be further depicted and described below, the memory 124 can include at least one program product having a set (e.g., at least one) of program modules 130 that are configured to carry out the functions of embodiments of the invention.

The computer system 100 is operational with numerous other computing system environments or configurations. Examples of well-known computing systems, environments, and/or configurations that may be suitable for use with computer system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine ("a configured processor"), such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one aspect, a service provider may perform process steps of the invention on a subscription, advertising, and/or fee basis. That is, a service provider could offer to integrate computer-readable program code into the computer system 100 to enable the computer system 100 to perform the processes of FIGS. 1 and 2 discussed above. The service provider can create, maintain, and support, etc., a computer infrastructure, such as components of the computer system 100, to perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 110, from a tangible computer-readable medium device 128; (2) adding one or more computing devices to the computer infrastructure 100; and (3) incorporating and/or modifying one or more existing systems 110 of the computer infrastructure 100 to enable the computer infrastructure 100 to perform process steps of the invention.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply any precedence, ordering or ranking of any claim elements, limitations or process steps.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
subscribing a plurality of consumer message threads to each of a plurality of topics comprising a high-priority topic and a low-priority topic, wherein the low-priority topic is different from the high-priority topic;
initializing the high-priority topic and the low-priority topic as not-paused;
polling for an unread message from not-paused ones of the high-priority topic and the low-priority topic;
in response to a return of an unread message from the polling for an unread message from not-paused ones of the high-priority topic and the low-priority topic, pausing the low-priority topic and processing the returned unread message;
until determining that no new message is returned, iteratively repolling for new unread messages from not-paused ones of the high-priority topic and the low-priority topic and processing any new unread messages returned from each repolling, wherein the low-priority topic is paused during each repolling executed prior to determining that no new message is returned from the repolling;
in response determining that no new message is returned from a repolling of the iterative repolling, un-pausing the paused low-priority topic; and
polling for another unread message from the not-paused high-priority topic and the un-paused low-priority topic.

2. The method of claim 1, further comprising:
in response to a return of another unread message from the polling for another unread message from the not-paused high-priority topic and the un-paused low-priority topic:
re-pausing the un-paused low-priority topic;
processing the returned another unread message; and
until determining that no new message is returned, iteratively repolling for new unread messages from not-paused ones of the high-priority topic and the low-priority topic and processing any new unread messages returned from each repolling, wherein the low-priority topic is re-paused during each repolling executed prior to determining that no new message is returned from the repolling.

3. The method of claim 2, further comprising:
defining the high priority topic to comprise a message from a customer user via a login activity that requests a service and requires at least one of a profile rebuild for the customer and a permission refresh for the customer; and
defining the low priority topic to comprise messages that are not from the customer user via a login activity.

4. The method of claim 3, wherein the plurality of consumer message threads are defined within a KAFKA messaging queue system, the method further comprising:
subscribing the plurality of consumer message threads to each of the plurality of topics via a representational state transfer KAFKA consumer subscribe application programming interface call;
polling for the unread message from the not-paused ones of the high-priority topic and the low-priority topic via a representational state transfer KAFKA consumer poll application programming interface call;
pausing the low-priority topic via a representational state transfer KAFKA consumer pause application programming interface call; and
unpausing the low-priority topic via a representational state transfer KAFKA consumer resume application programming interface call.

5. The method of claim 4, wherein at least one of the pausing and the re-pausing of the low-priority topic comprises:
getting current thread topic partition assignments;

iteratively looping through the current topic partition assignments and extracting low priority topic partitions from the current thread topic partition assignments;

pausing the extracted low priority topic partitions; and saving the paused extracted low priority topic partitions to a list; and wherein the listed extracted low priority topic partitions are paused during the iteratively repolling for new unread messages.

6. The method of claim 5 further comprising:

getting current thread topic partition assignments via a representational state transfer KAFKA consumer assignment application programming interface call.

7. The method of claim 1, further comprising:

integrating computer-readable program code into a computer system comprising a processor, a computer-readable memory in circuit communication with the processor, and a computer-readable storage medium in circuit communication with the processor; and wherein the processor executes program code instructions stored on the computer-readable storage medium via the computer-readable memory and thereby performs the subscribing the plurality of consumer message threads to each of the plurality of topics comprising the high-priority topic and the low-priority topic, the initializing the high-priority topic and the low-priority topic as not-paused, the polling for the unread message from not-paused ones of the high-priority topic and the low-priority topic, the pausing the low-priority topic and processing the returned unread message in response to the return of the unread message from the polling for the unread message from the not-paused ones of the high-priority topic and the low-priority topic, the iteratively repolling for new unread messages from not-paused ones of the high-priority topic and the low-priority topic and the processing any new unread messages returned from each repolling until determining that no new message is returned, the un-pausing the paused low-priority topic, and the polling for another unread message from the not-paused high-priority topic and the un-paused low-priority topic.

8. The method of claim 7, wherein the computer-readable program code is provided as a service in a cloud environment.

9. A system, comprising:

a processor;

a computer-readable memory in circuit communication with the processor;

a computer-readable storage medium in circuit communication with the processor; and wherein the processor executes program instructions stored on the computer-readable storage medium via the computer-readable memory and thereby:

subscribes a plurality of consumer message threads to each of a plurality of topics comprising a high-priority topic and a low-priority topic, wherein the low-priority topic is different from the high-priority topic;

initializes the high-priority topic and the low-priority topic as not-paused;

polls for an unread message from not-paused ones of the high-priority topic and the low-priority topic;

in response to a return of an unread message from polling for an unread message from not-paused ones of the high-priority topic and the low-priority topic, pauses the low-priority topic and processes the returned unread message; and until determining that no new message is returned, iteratively repolls for new unread messages from not-paused ones of the high-priority topic and the low-priority topic and processes any new unread messages returned from each repolling, wherein the low-priority topic is paused during each repolling executed prior to determining that no new message is returned from the repolling;

un-pauses the paused low-priority topic in response determining that no new message is returned from a repolling of the iterative repolling; and polls for another unread message from the not-paused high-priority topic and the un-paused low-priority topic.

10. The system of claim 9, wherein the processor executes the program instructions stored on the computer-readable storage medium via the computer-readable memory and thereby:

in response to a return of another unread message from polling for another unread message from the not-paused high-priority topic and the un-paused low-priority topic:

re-pauses the un-paused low-priority topic;

processes the returned another unread message; and until determining that no new message is returned, iteratively repolls for new unread messages from not-paused ones of the high-priority topic and the low-priority topic and processes any new unread messages returned from each repolling, wherein the low-priority topic is re-paused during each repolling executed prior to determining that no new message is returned from the repolling.

11. The system of claim 10, wherein the processor executes the program instructions stored on the computer-readable storage medium via the computer-readable memory and thereby:

defines the high priority topic to comprise a message from a customer user via a login activity that requests a service and requires at least one of a profile rebuild for the customer and a permission refresh for the customer; and defines the low priority topic to comprise messages that are not from the customer user via a login activity.

12. The system of claim 11, wherein the plurality of consumer message threads are defined within a KAFKA messaging queue system, and wherein the processor executes the program instructions stored on the computer-readable storage medium via the computer-readable memory and thereby:

subscribes the plurality of consumer message threads to each of the plurality of topics via a representational state transfer KAFKA consumer subscribe application programming interface call;

polls for the unread message from the not-paused ones of the high-priority topic and the low-priority topic via a representational state transfer KAFKA consumer poll application programming interface call;

pauses the low-priority topic via a representational state transfer KAFKA consumer pause application programming interface call; and un-pauses the low-priority topic via a representational state transfer KAFKA consumer resume application programming interface call.

13. The system of claim 12, wherein the processor executes the program instructions stored on the computer-readable storage medium via the computer-readable memory and thereby, pauses or re-pauses the low-priority topic by:

getting current thread topic partition assignments;

iteratively looping through the current topic partition assignments and extracting low priority topic partitions from the current thread topic partition assignments;

pausing the extracted low priority topic partitions; and saving the paused extracted low priority topic partitions to a list; and wherein the listed extracted low priority topic partitions are paused during the iteratively repolling for new unread messages.

14. A computer program product, comprising:

a computer-readable storage medium having computer-readable program code embodied therewith, wherein the computer-readable storage medium is not a transitory signal per se, the computer-readable program code comprising instructions for execution by a processor that cause the processor to:

subscribe a plurality of consumer message threads to each of a plurality of topics comprising a high-priority topic and a low-priority topic, wherein the low-priority topic is different from the high-priority topic;

initialize the high-priority topic and the low-priority topic as not-paused;

poll for an unread message from not-paused ones of the high-priority topic and the low-priority topic;

in response to a return of an unread message from polling for an unread message from not-paused ones of the high-priority topic and the low-priority topic, pause the low-priority topic and process the returned unread message; and until determining that no new message is returned, iteratively repoll for new unread messages from not-paused ones of the high-priority topic and the low-priority topic and process any new unread messages returned from each repolling, wherein the low-priority topic is paused during each repolling executed prior to determining that no new message is returned from the repolling;

un-pause the paused low-priority topic in response determining that no new message is returned from a repolling of the iterative repolling; and poll for another unread message from the not-paused high-priority topic and the un-paused low-priority topic.

15. The computer program product of claim 14, wherein the computer-readable program code instructions for execution by the processor further cause the processor to:

in response to a return of another unread message from polling for another unread message from the not-paused high-priority topic and the un-paused low-priority topic:

re-pause the un-paused low-priority topic;

process the returned another unread message; and until determining that no new message is returned, iteratively repoll for new unread messages from not-paused ones of the high-priority topic and the low-priority topic and process any new unread messages returned from each repolling, wherein the low-priority topic is re-paused during each repolling executed prior to determining that no new message is returned from the repolling.

16. The computer program product of claim 15, wherein the computer-readable program code instructions for execution by the processor further cause the processor to:

define the high priority topic to comprise a message from a customer user via a login activity that requests a service and requires at least one of a profile rebuild for the customer and a permission refresh for the customer; and define the low priority topic to comprise messages that are not from the customer user via a login activity.

17. The computer program product of claim 16, wherein the plurality of consumer message threads are defined within a KAFKA messaging queue system, and wherein the computer-readable program code instructions for execution by the processor further cause the processor to:

subscribe the plurality of consumer message threads to each of the plurality of topics via a representational state transfer KAFKA consumer subscribe application programming interface call;

poll for the unread message from the not-paused ones of the high-priority topic and the low-priority topic via a representational state transfer KAFKA consumer poll application programming interface call;

pause the low-priority topic via a representational state transfer KAFKA consumer pause application programming interface call; and un-pause the low-priority topic via a representational state transfer KAFKA consumer resume application programming interface call.

\* \* \* \* \*